United States Patent
Moser, III et al.

(10) Patent No.: US 11,087,350 B1
(45) Date of Patent: Aug. 10, 2021

(54) SYSTEM FOR PROCESSING A COUPON INCLUDING CODED INDICIA HAVING AN IMAGE INSUFFICIENT FOR REDEMPTION AND RELATED METHODS

(71) Applicant: INMAR CLEARING, INC., Winston-Salem, NC (US)

(72) Inventors: Wade Hauser Moser, III, Winston-Salem, NC (US); John Kevin Ross, Kennesaw, GA (US); Gregory L. Kerr, Winston-Salem, NC (US); Jess D. Walker, Georgetown, TX (US)

(73) Assignee: INMAR CLEARING, INC., Winston-Salem, NC (US)

( * ) Notice: Subject to any disclaimer, the term of this patent is extended or adjusted under 35 U.S.C. 154(b) by 728 days.

(21) Appl. No.: 15/663,025

(22) Filed: Jul. 28, 2017

(51) Int. Cl.
*G06Q 30/00* (2012.01)
*G06Q 30/02* (2012.01)
*G06Q 20/38* (2012.01)
*G06K 7/14* (2006.01)

(52) U.S. Cl.
CPC ....... *G06Q 30/0225* (2013.01); *G06K 7/1443* (2013.01); *G06K 7/1491* (2013.01); *G06Q 20/387* (2013.01)

(58) Field of Classification Search
CPC .... G06Q 30/225; G06Q 20/387; G06Q 30/02; G06Q 30/0282; G06Q 30/0281; G06Q 30/0283; G06K 7/1491; G06K 7/1443
USPC ...................................................... 705/14.26
See application file for complete search history.

(56) References Cited

U.S. PATENT DOCUMENTS

| | | | | |
|---|---|---|---|---|
| 8,046,257 | B2* | 10/2011 | Wane | G06Q 20/10 705/14.38 |
| 8,386,309 | B2* | 2/2013 | Thibedeau | G06Q 30/02 705/14.38 |
| 8,523,075 | B2* | 9/2013 | van der Merwe | G06K 7/1447 235/435 |
| RE45,006 | E * | 7/2014 | Deaton | G06Q 20/208 705/14.39 |
| 8,793,159 | B2* | 7/2014 | Chen | G06Q 30/0233 705/14.27 |
| 9,031,860 | B2* | 5/2015 | Winters | G06Q 30/0231 705/14.1 |
| 9,892,419 | B1* | 2/2018 | Grossman | G06Q 30/0225 |
| 10,152,711 | B2* | 12/2018 | Ozvat | G06Q 20/3829 |
| 10,332,106 | B2* | 6/2019 | Ozvat | G06Q 20/382 |
| 10,346,838 | B2* | 7/2019 | Ozvat | G06Q 20/401 |
| 10,346,843 | B2* | 7/2019 | Ozvat | G06Q 20/20 |
| 10,360,551 | B1* | 7/2019 | Perry | G06Q 20/3223 |
| 10,636,032 | B2* | 4/2020 | Ozvat | G06Q 20/20 |

(Continued)

*Primary Examiner* — David J Stoltenberg
*Assistant Examiner* — Michael I Ezewoko
(74) *Attorney, Agent, or Firm* — Allen, Dyer, Doppelt + Gilchrist, P.A. Attorneys at Law

(57) ABSTRACT

A system for processing a coupon that includes coded indicia having an image insufficient for redemption may include a mobile wireless communications device configured to acquire the image of the coupon. The system may also include a digital coupon conversion server that includes a processor and memory cooperating therewith to receive the image of the coupon from the mobile wireless communications device and process the image of the coupon to generate a modified image sufficient for redemption. The processor and memory may cooperate to store the modified image for subsequent retrieval and redemption.

18 Claims, 7 Drawing Sheets

(56) References Cited

U.S. PATENT DOCUMENTS

| | | | |
|---|---|---|---|
| 10,769,655 B2* | 9/2020 | Pavlidis | G06Q 30/0268 |
| 2010/0187311 A1* | 7/2010 | van der Merwe | G06K 9/183 |
| | | | 235/462.01 |
| 2011/0264497 A1* | 10/2011 | Clyne | G06Q 40/10 |
| | | | 705/14.17 |
| 2011/0302012 A1* | 12/2011 | Duroux | G06Q 30/0215 |
| | | | 705/14.17 |
| 2012/0203614 A1* | 8/2012 | Chen | G06Q 30/02 |
| | | | 705/14.25 |
| 2013/0085829 A1* | 4/2013 | Kavis | G06Q 30/06 |
| | | | 705/14.26 |
| 2013/0166368 A1* | 6/2013 | Thibedeau | G06Q 30/0238 |
| | | | 705/14.26 |
| 2013/0246147 A1* | 9/2013 | Chen | G06Q 30/0234 |
| | | | 705/14.25 |
| 2013/0275197 A1* | 10/2013 | Thibedeau | G06Q 30/04 |
| | | | 705/14.26 |
| 2013/0325567 A1* | 12/2013 | Bradley | G06Q 30/0207 |
| | | | 705/14.1 |
| 2014/0040145 A1* | 2/2014 | Ozvat | G06Q 20/027 |
| | | | 705/64 |
| 2014/0040148 A1* | 2/2014 | Ozvat | G06Q 20/3829 |
| | | | 705/71 |
| 2014/0058823 A1 | 2/2014 | Ross et al. | |
| 2014/0114860 A1* | 4/2014 | Ozvat | G06Q 20/382 |
| | | | 705/64 |
| 2014/0180924 A1* | 6/2014 | Ozvat | G06Q 20/20 |
| | | | 705/44 |
| 2014/0297382 A1* | 10/2014 | Chiussi | G06Q 30/0225 |
| | | | 705/14.26 |
| 2014/0330628 A1* | 11/2014 | Chen | G06Q 30/0226 |
| | | | 705/14.25 |
| 2015/0058108 A1* | 2/2015 | Winters | G06Q 30/02 |
| | | | 705/14.23 |
| 2015/0081462 A1* | 3/2015 | Ozvat | G06Q 20/40 |
| | | | 705/21 |
| 2015/0363812 A1* | 12/2015 | Mcmillan | G06Q 30/0225 |
| | | | 705/14.26 |
| 2015/0379551 A1* | 12/2015 | Carvallo | G06Q 30/0225 |
| | | | 705/14.56 |
| 2015/0379552 A1* | 12/2015 | Kent | G06Q 20/202 |
| | | | 705/14.38 |
| 2016/0155107 A1* | 6/2016 | Haijji | G06Q 20/387 |
| | | | 705/17 |
| 2018/0285912 A1* | 10/2018 | Thibedeau | G06Q 30/0211 |
| 2019/0066104 A1* | 2/2019 | Ozvat | G06Q 20/385 |
| 2019/0272543 A1* | 9/2019 | Ozvat | G06Q 20/20 |
| 2019/0272545 A1* | 9/2019 | Ozvat | G06Q 20/20 |
| 2019/0333053 A1* | 10/2019 | Ozvat | G06Q 20/202 |
| 2020/0211006 A1* | 7/2020 | Ozvat | G06Q 20/20 |
| 2020/0320532 A1* | 10/2020 | Ozvat | G06Q 20/202 |

* cited by examiner

SYSTEM FOR PROCESSING A COUPON INCLUDING CODED INDICIA HAVING AN IMAGE INSUFFICIENT FOR REDEMPTION AND RELATED METHODS

TECHNICAL FIELD

The present invention is related to the field of electronics, and more particularly, to a system for processing promotions, and related methods.

BACKGROUND

Sales of a particular product or service may be based upon how well that product or service is marketed to a consumer. One form of marketing is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon's redeemable value may vary based upon the quantity of a given item, size of the product in terms of packaging, and/or the price point of the given item. A given consumer may have a redeemable value threshold at which point that consumer would be compelled to purchase the given product. Other consumers may purchase the given product regardless of whether a coupon or promotion is available.

A coupon may redeemed at a point-of-sale (POS) terminal in communication with a promotions server. For example, during the checkout process, the shopper's basket may be sent to the promotions server. Any coupons to be redeemed by the shopper are generally presented during the checkout process and processed via the POS terminal. For example, the POS terminal may send information regarding the coupon to be redeemed to the promotions server for processing.

One type of coupon is a paper coupon. A paper coupon is typically found in a printed publication or advertisement, for example, a newspaper, and is cut from the printed publication. The paper coupon typically includes information about the offer, including product purchase requirements and the discount. The information may be both in printed words and encoded, for example, in the form of barcode so that it can be scanned for redemption at the POS. The shopper generally presents the paper coupon at the POS terminal during the checkout process to redeem.

Another type of coupon is a digital coupon. A digital coupon is an electronic form of or counterpart to a paper coupon. A digital coupon may include the same information as a paper coupon, for example, a barcode and written words representative of the offer, and may be configured for display on a display.

SUMMARY

A system for processing a coupon that includes coded indicia having an image insufficient for redemption may include a mobile wireless communications device configured to acquire the image of the coupon. The system may also include a digital coupon conversion server that includes a processor and memory cooperating therewith to receive the image of the coupon from the mobile wireless communications device and process the image of the coupon to generate a modified image sufficient for redemption. The processor and memory may cooperate to store the modified image for subsequent retrieval and redemption.

The mobile wireless communications device may include a mobile device processor and a display coupled thereto. The mobile device processor may be configured to retrieve the stored modified image and display the stored modified image on the display for redemption as a digital coupon, for example. The system may include a point-of-sale (POS) terminal configured to cooperate with the digital coupon conversion server to retrieve and redeem the stored modified image as a digital coupon thereat.

The coupon may include a paper coupon that may include a paper substrate with the coded indicia thereon, for example. The coded indicia may include an incomplete barcode. The coded indicia may include an incomplete GS1 barcode, for example.

The processor may be configured to process the image of the coupon to generate the modified image sufficient for redemption by appending further coded indicia to the coded indicia. The modified image may include coded indicia sufficient for redemption, for example. The modified image may include a complete GS1 code, for example.

A method aspect is directed to a method of processing a coupon including coded indicia having an image insufficient for redemption. The method may include using a digital coupon conversion server including a processor cooperating with a memory to receive the image of the coupon from a mobile wireless communications device configured to acquire the image of the coupon and process the image of the coupon to generate a modified image sufficient for redemption. The digital coupon conversion server may be used to store in the memory the modified image for subsequent retrieval and redemption.

A computer readable medium aspect is directed to a non-transitory computer readable medium for processing a coupon including coded indicia having an image insufficient for redemption. The non-transitory computer readable medium includes computer executable instructions that when executed by a processor coupled to a memory cause the processor to perform operations that may include receiving the image of the coupon from a mobile wireless communications device configured to acquire the image of the coupon and processing the image of the coupon to generate a modified image sufficient for redemption. The operations may also include storing in the memory the modified image for subsequent retrieval and redemption.

DETAILED DESCRIPTION

The present invention will now be described more fully hereinafter with reference to the accompanying drawings, in which preferred embodiments of the invention are shown.

This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
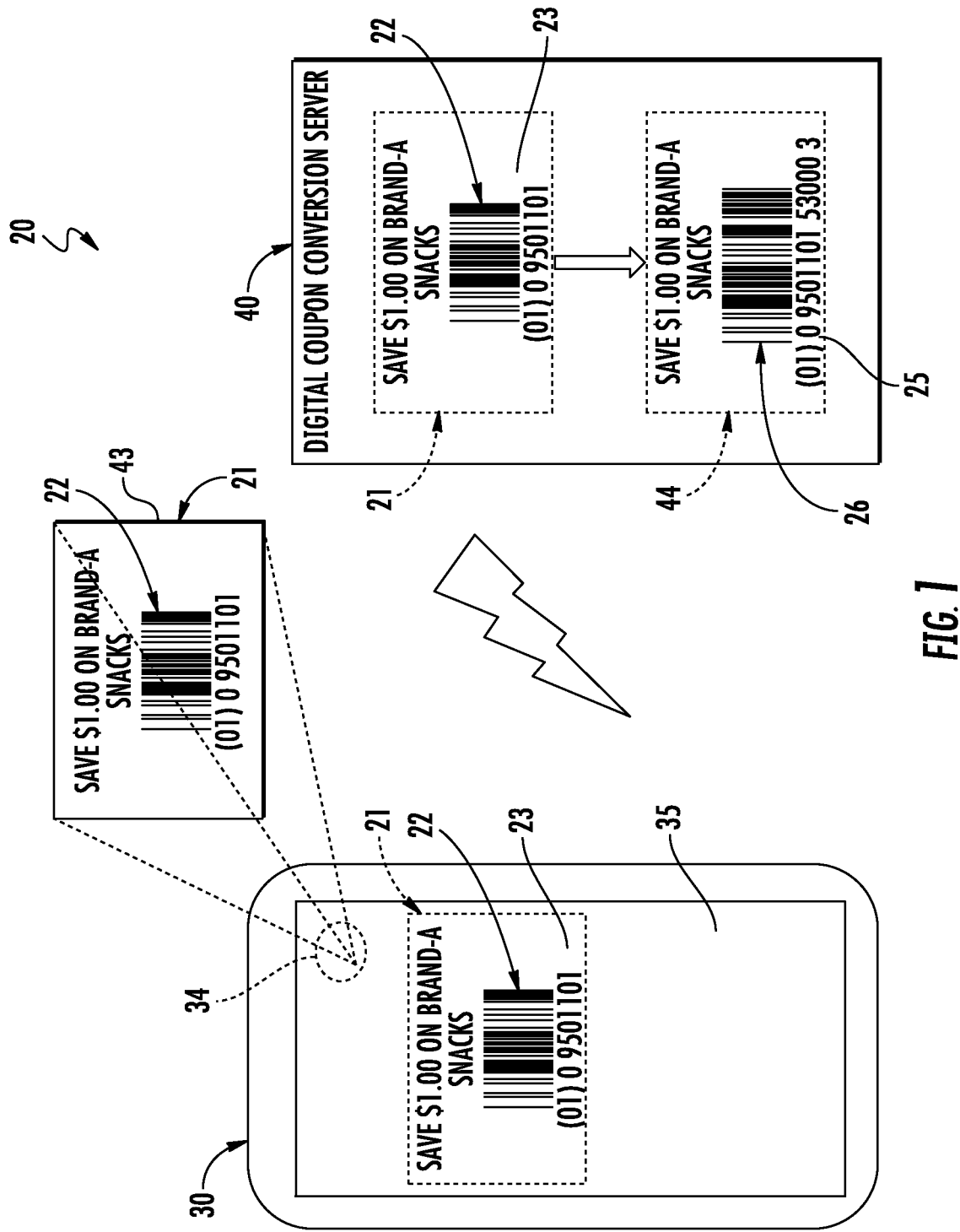
FIG. 1 is a schematic diagram of a system according to an embodiment.
Figure 2:
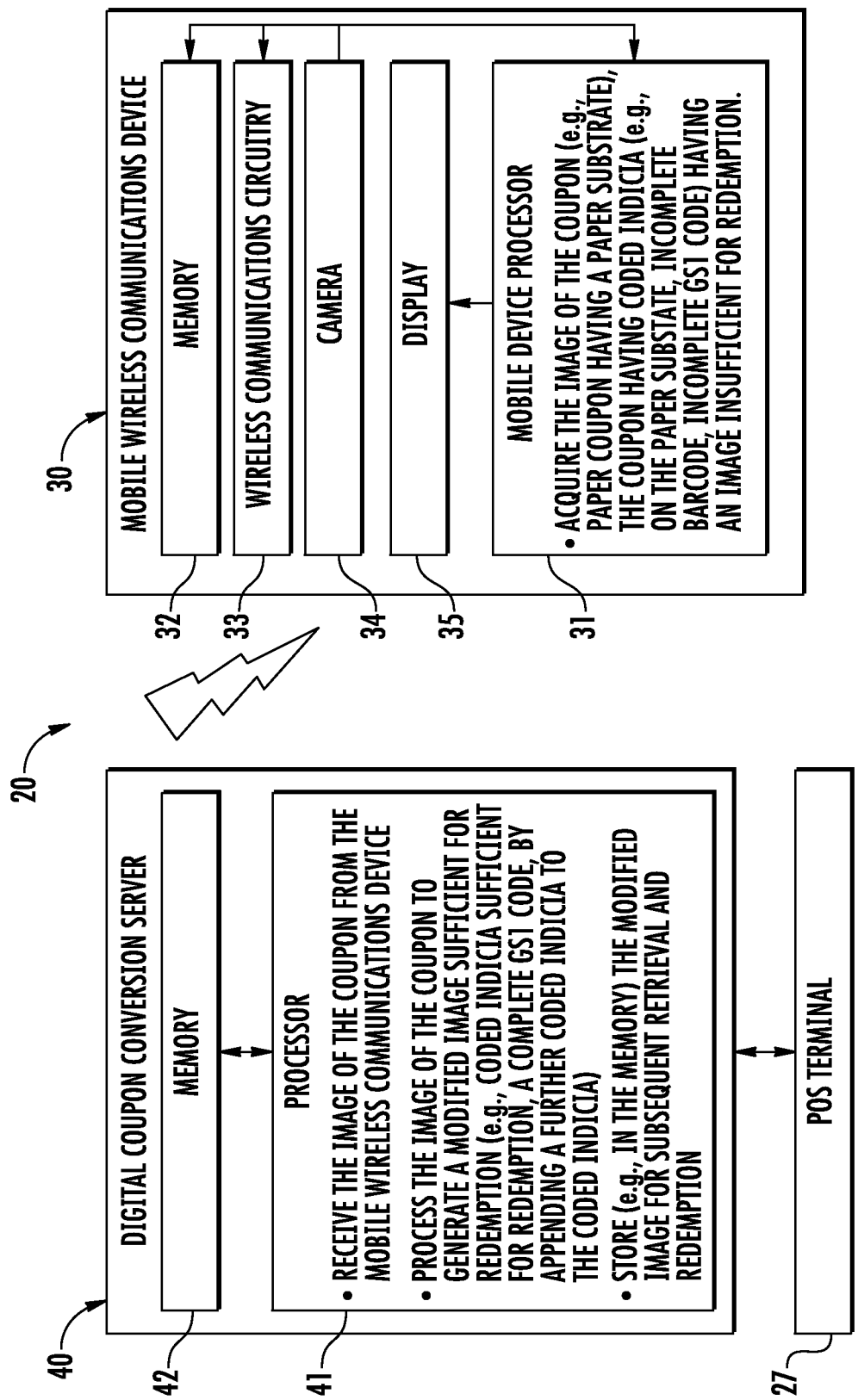
FIG. 2 is a schematic block diagram of the system of FIG. 1.

Referring initially to FIGS. 1 and 2, a system 20 is for processing a coupon 21 that includes coded indicia 22 having an image 23 insufficient for redemption. The coupon 21 may be a paper coupon, for example, of the type that is cut from a printed publication or advertisement and presented at a point-of-sale (POS) terminal 27 associated with a retailer for redemption, and may include a paper substrate 43 with the coded indicia 22 thereon. The coded indicia 22 may include a printed barcode, for example. The printed barcode may be a portion of or an incomplete GS1 barcode, for example. In other words, if the coupon is presented at the POS terminal 27 for redemption, the coded indicia image is insufficient or incomplete so that the coupon cannot be redeemed. Of course, the coupon 21 may include other types of coded indicia, for example, QR codes, text, etc.

The system 20 may include a mobile wireless communications device 30. The mobile wireless communications device 30 illustratively includes a mobile device processor 31, a memory 32 coupled to the mobile device processor, and wireless communications circuitry 33 coupled to the mobile device processor. The mobile wireless communications device 30 also includes an image acquisition device, for example, a camera 34 and a display 35, both coupled to the mobile device processor 31. The mobile wireless communications device 30 may be in the form of a mobile telephone, smartphone, tablet, portable computer, or other mobile wireless communications device, as will be appreciated by those skilled in the art.

Figure 3:
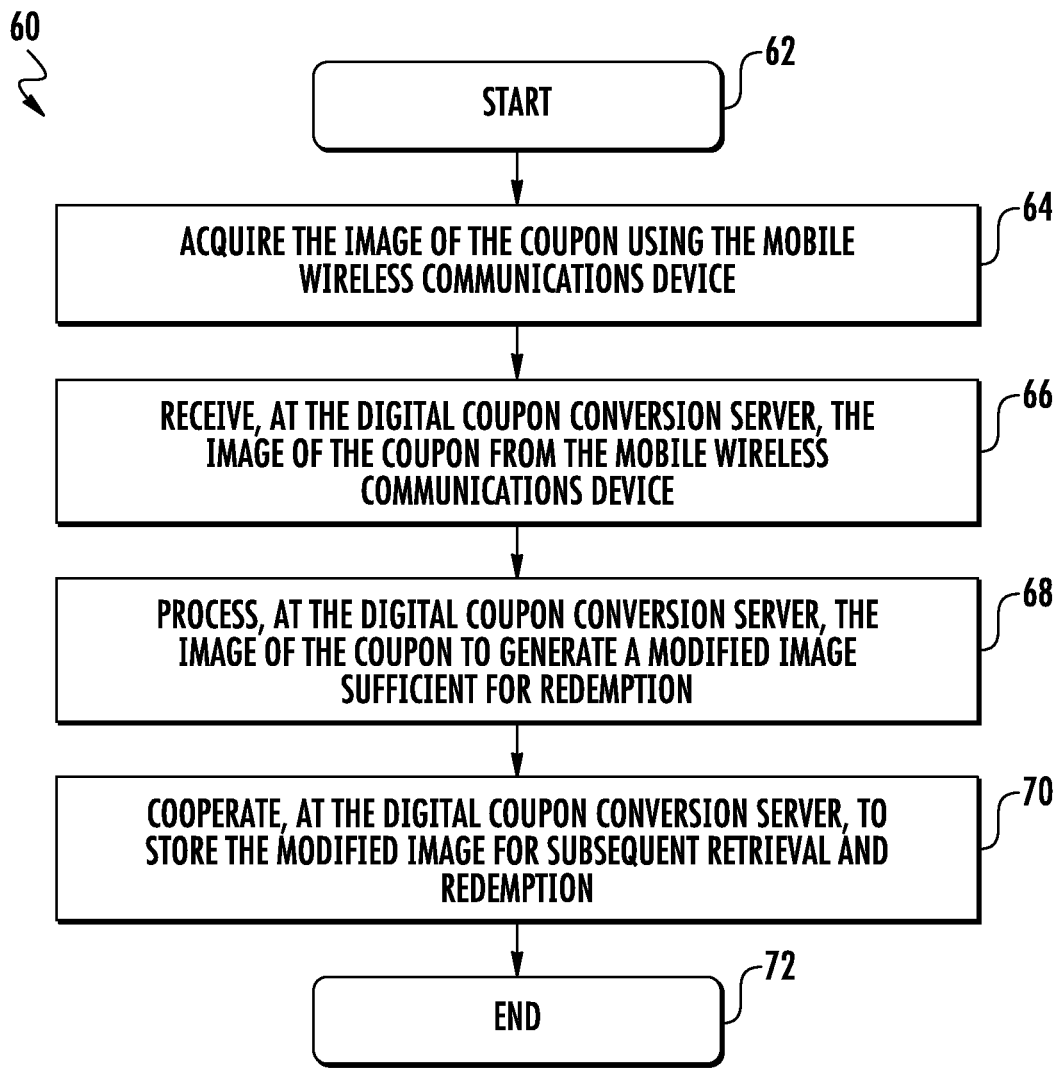
FIG. 3 is a flow chart of a method of a processing a coupon according to an embodiment.

Referring now additionally to the flowchart 60 in FIG. 3, beginning at Block 62, processing of the coupon 21 will now be described. The mobile device processor 31 cooperates with the camera 34 to acquire the image of the coupon 21 (Block 64). The image of the coupon 21 is communicated, for example, wirelessly via the wireless communications circuitry 33, to a digital coupon conversion server 40.

The digital coupon conversion server 40 includes a processor 41 and memory 42 cooperating therewith. The processor 41 cooperates with the memory 42 to receive, for example, wirelessly, the image 23 of the coupon 21 from the mobile wireless communications device 30 (Block 66). The processor 41 cooperates with the memory 42 to process the image 23 of the coupon 21 to generate a modified image 25 sufficient for redemption (Block 68). The processor 41 processes the image 23 of the coupon 21 to generate the modified image 25 by appending further coded indicia 26 to the coded indicia 22. The further coded indicia 26 may be based upon the coded indicia 22. In other words, the coded indicia 22 may be used as a basis to determine the further coded indicia 26 to be appended. In the GS1 code example, the incomplete GS1 code may be used to determine the remainder of the GS1 code. Of course, other and/or additional factors may be used, for example, information acquired from the coupon 21 or the image 23 of the coded indicia 22. The modified image thus includes coded indicia sufficient for redemption, for example, a complete GS1 code.

At Block 70, the processor 41 and memory 42 cooperate to store, in the memory 42 for example, the modified image 25 for subsequent retrieval and redemption. In other words, the modified image 25 is stored in the memory 42 for subsequent redemption as a digital coupon 44, for example. In an embodiment, the modified image 25 may be stored in a digital wallet associated with a user, for example, the same user associated with the mobile wireless communications device 30. The method ends at Block 72.

Figure 4:
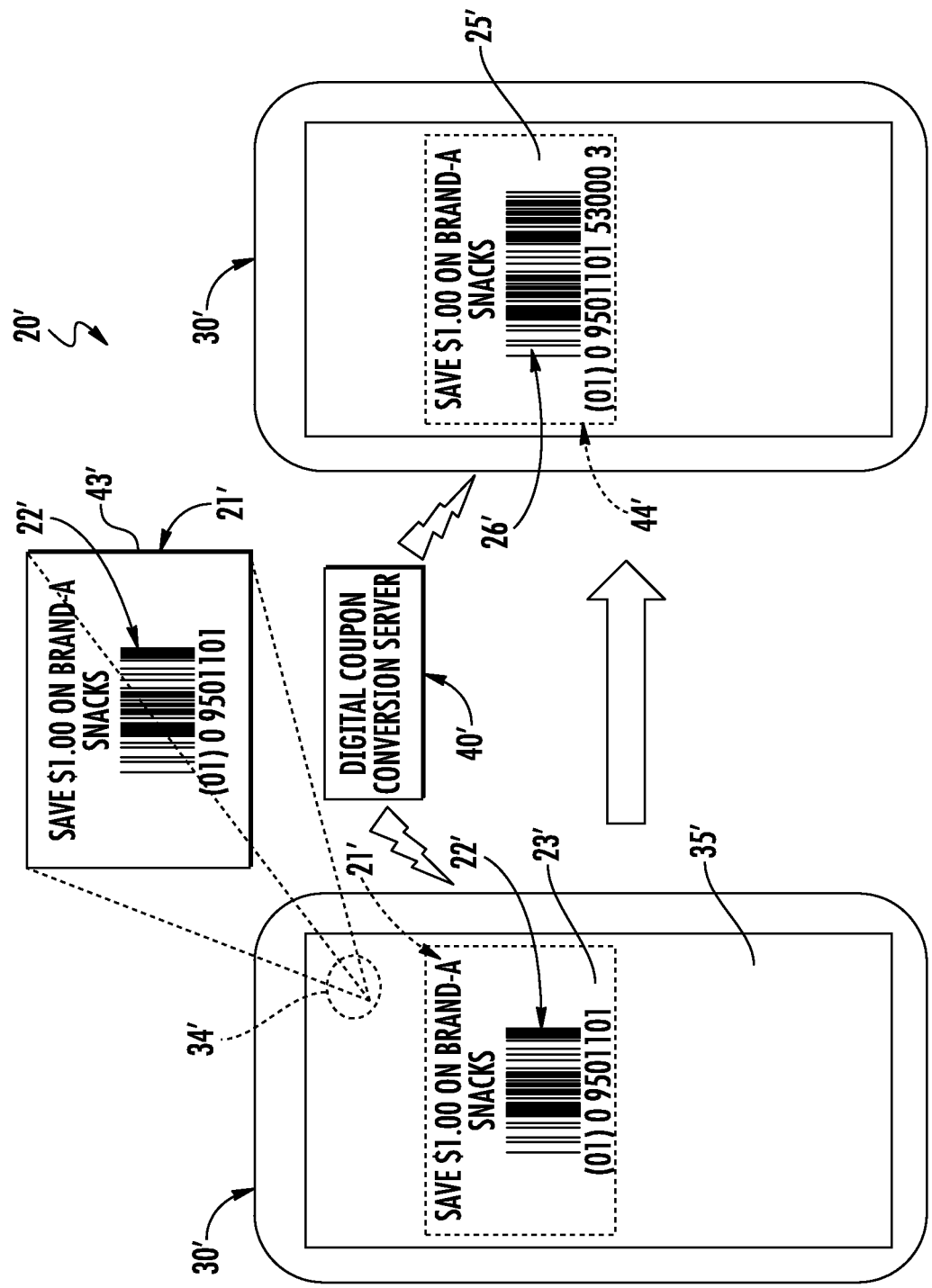
FIG. 4 is a schematic diagram of a system according to another embodiment.
Figure 5:
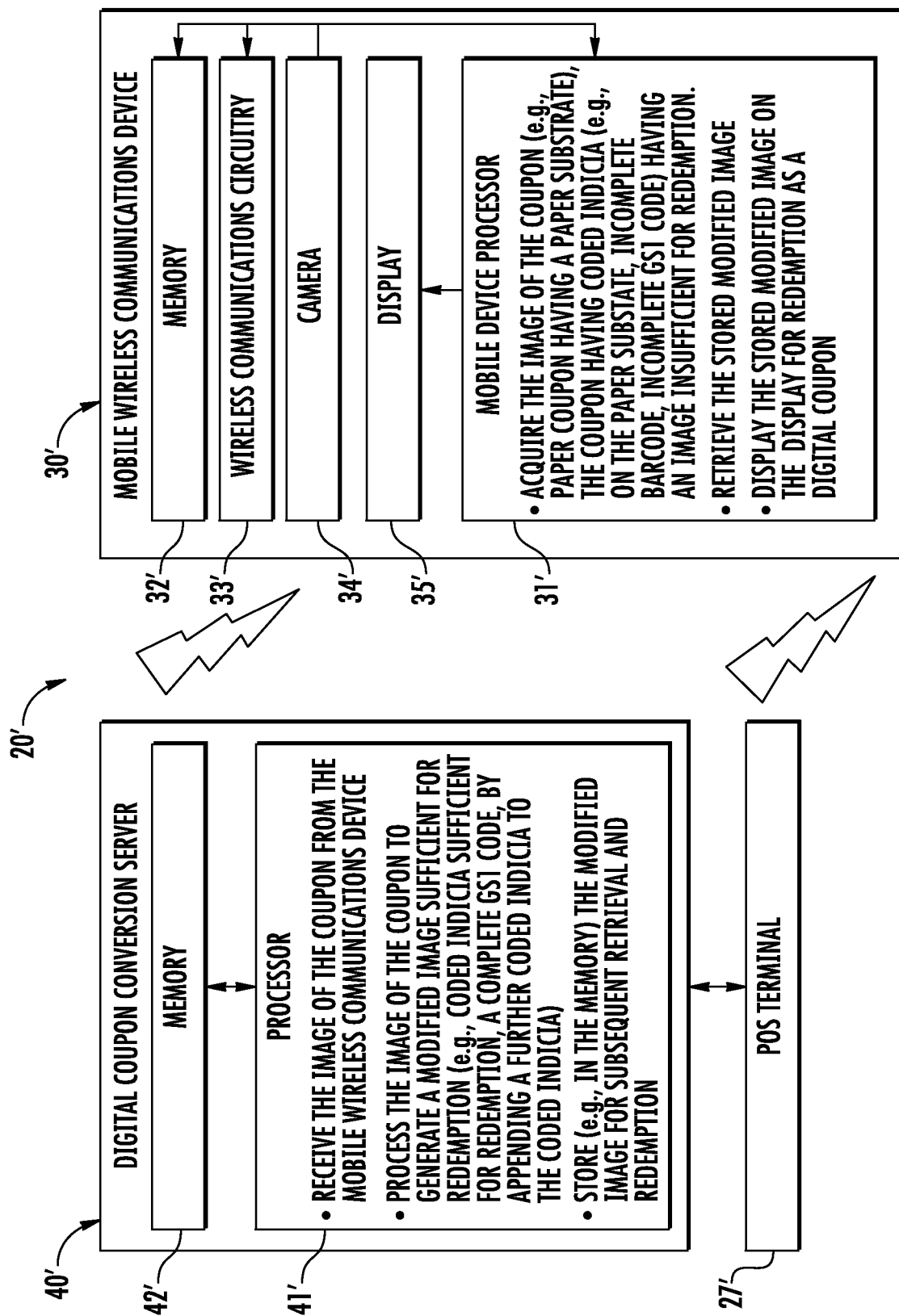
FIG. 5 is a schematic block diagram of the system of FIG. 4.

Referring now to FIGS. 4-7, embodiments with respect to redemption of the stored modified image 25 will be discussed, and elements not specifically described, but illustrated are similar to those described above and need no further description. Referring to FIGS. 4-5, in another embodiment, redemption may be performed via the mobile wireless communications device 30'. More particularly, the mobile wireless communications device 30' may communicate with the digital coupon conversion server 40' to retrieve the modified image 25' from the memory 42'. The mobile device processor 31' displays the stored modified image on the display 35' for redemption as a digital coupon 44'. As will be appreciated by those skilled in the art, the displayed modified image 25' or more particularly, the further coded indicia 26', e.g., the complete GS1 code, may be scanned or keyed at the POS terminal 27' so that the associated discount is applied during the checkout process. In some embodiments, the mobile wireless communications device 30' may forward the retrieved modified image 25' to the POS terminal 27' with or without displaying the modified image, for example, wirelessly through near-field communication (NFC) or other communications protocol. Additionally, in some embodiments, the modified image 25' may not be wholly displayed, for example, so that an identifier or digital code associated with the modified image may be keyed in to the POS terminal 27'.

Figure 6:
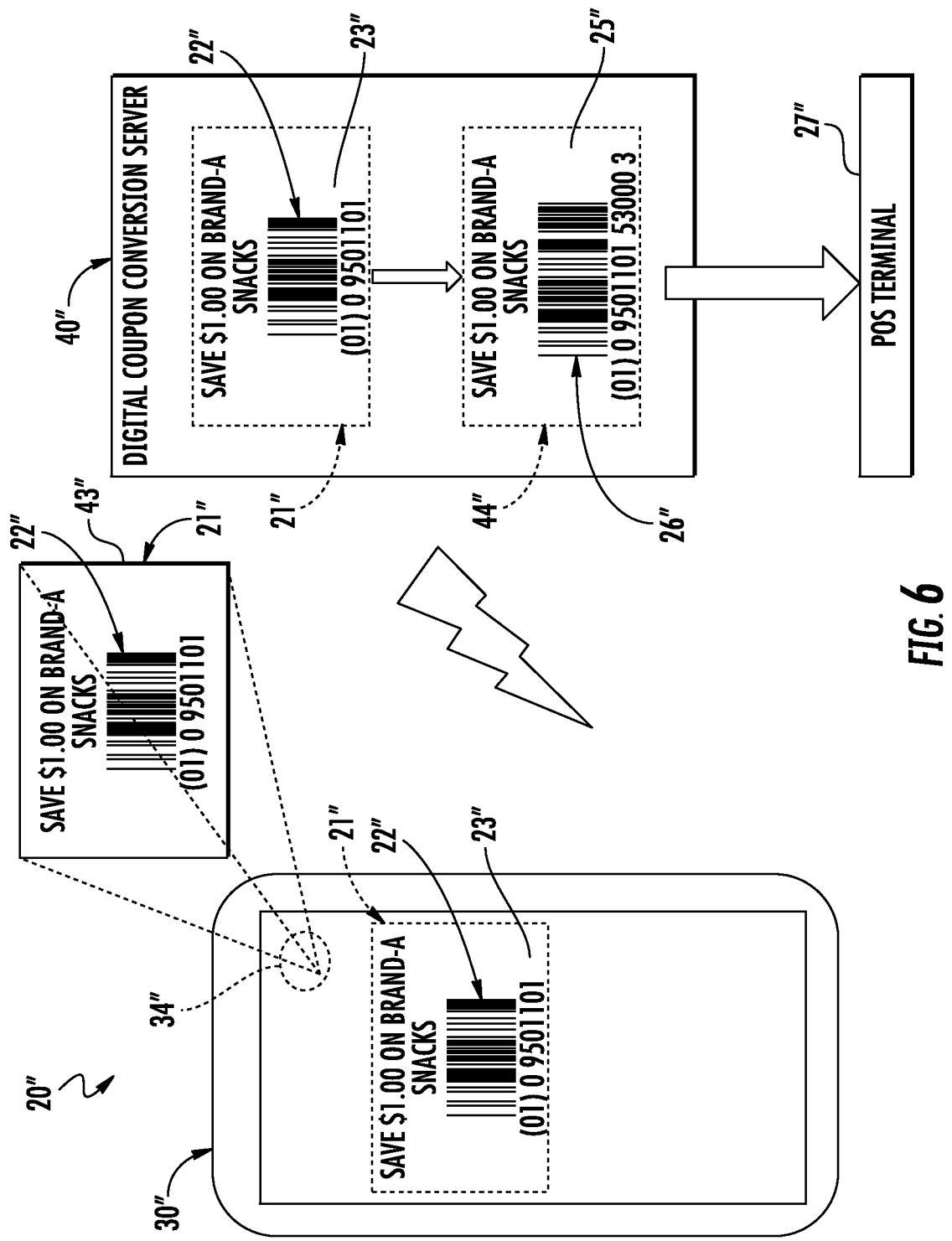
FIG. 6 is a schematic diagram of a system according to another embodiment.
Figure 7:
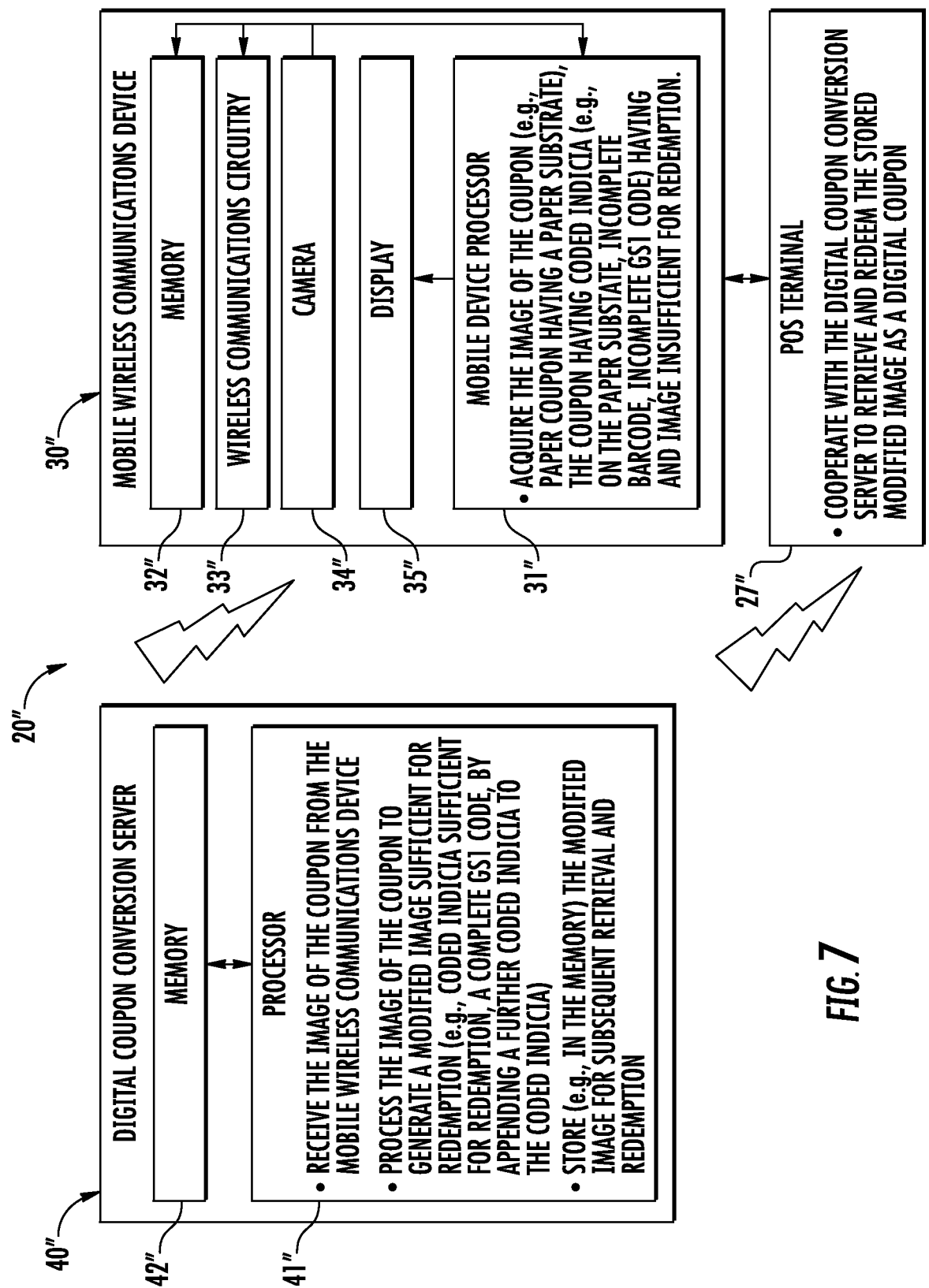
FIG. 7 is a schematic block diagram of the system of FIG. 6.

Referring now to FIGS. 6-7, in another embodiment, redemption may be performed via the POS terminal 27". More particularly, the POS terminal 27" may cooperate with the digital coupon conversion server 40" to retrieve and redeem the stored modified image 25" as a digital coupon 44" thereat. For example, the user may enter a user identifier (e.g., associated with a loyalty program, a phone number) and also associated with the mobile wireless communications device 30". Based upon the user identifier, the POS terminal retrieves the modified image 25" and applies the corresponding discount during the checkout process. In the present embodiment, there is no displayed version of the modified image to be keyed or scanned at the POS terminal 27". In some embodiments, the modified image 25" may be displayed at the POS terminal 27".

A method aspect is directed to a method of processing a coupon 21 that includes coded indicia 22 having an image 23 insufficient for redemption. The method includes using a digital coupon conversion server 40 that includes a processor 41 cooperating with a memory 42 to receive the image 23 of the coupon 21 from a mobile wireless communications device 30 configured to acquire the image of the coupon and process the image of the coupon to generate a modified image 25 sufficient for redemption. The method also includes using the digital coupon conversion server 40 to store in the memory 42 the modified image 25 for subsequent retrieval and redemption.

A computer readable medium aspect is directed to a non-transitory computer readable medium for processing a coupon 21 that includes coded indicia 22 having an image 23 insufficient for redemption. The non-transitory computer readable medium includes computer executable instructions that when executed by a processor 41 coupled to a memory 42 cause the processor to perform operations that include receiving the image 23 of the coupon 21 from a mobile wireless communications device 30 configured to acquire the image of the coupon and processing the image of the coupon to generate a modified image 25 sufficient for redemption. The operations may also include storing in the memory 42 the modified image 25 for subsequent retrieval and redemption.

As will be appreciated by those skilled in the art, the system 20 advantageously provides increased user convenience in that it permits a consumer or user to browse or clip a coupon in a traditional sense (i.e., from a paper advertisement or publication, for example), and "convert" that coupon to a digital coupon 44. However, simply converting a paper coupon 43 that is redeemable (i.e., sufficient for redemption, having a complete GS1 code) to a digital coupon 44 may not be particularly advantageous in that it may permit fraudulent copies of the paper coupon. The embodiments of the system 20 described herein may not permit fraudulent duplication, as the image of the coded indicia is insufficient for redemption. Furthermore, the system 20 reduces the overall amount of paper coupons to be processed by a retailer, thus reducing processing costs. Still further, unlike a conventional coupon processing system, the system 20 operates with coded indicia that is insufficient for redemption, and redemption may be controlled through the appending of the further coded indicia or the generation of the modified image.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for processing a paper coupon comprising coded indicia insufficient for redemption, the system comprising:
   a point-of-sale (POS) terminal;
   a mobile wireless communications device comprising a mobile device processor and a display coupled thereto, the mobile device processor configured to acquire an image of the paper coupon; and
   a digital coupon conversion server comprising a processor and memory cooperating therewith to
      receive the image of the paper coupon from said mobile wireless communications device, the coded indicia defining a first portion of a complete redemption code, the first portion defining an incomplete redemption code that is insufficient for redemption at said POS terminal, and the first portion, when combined with a second portion of the complete redemption code, defining the complete redemption code that is sufficient for redemption at said POS terminal,
      determine the second portion based upon the first portion relative to the complete redemption code,
      manipulate the image of the paper coupon to generate a modified image sufficient for redemption by appending the second portion to the first portion so that the modified image is sufficient for redemption at said POS terminal, and
      store the modified image for subsequent retrieval and redemption as a digital coupon at said POS terminal;
   said mobile device processor of said mobile wireless communications device being configured to retrieve the stored modified image and display the stored modified image on said display for redemption as the digital coupon.

2. The system of claim 1 wherein the paper coupon comprises a paper substrate with the coded indicia thereon.

3. The system of claim 1 wherein the coded indicia comprises an incomplete barcode.

4. The system of claim 1 wherein the coded indicia comprises an incomplete GS1 barcode.

5. The system of claim 1 wherein the modified image comprises a complete GS1 code.

6. A digital coupon conversion server for a system for processing a paper coupon comprising coded indicia insufficient for redemption, the digital coupon conversion server comprising:
   a memory; and
   a processor cooperating with said memory to
      receive an image of the paper coupon from a mobile wireless communications device configured to acquire the image of the paper coupon, the coded indicia defining a first portion of a complete redemption code, the first portion defining the complete redemption code that is insufficient for redemption at a point-of-sale (POS) terminal, and the first portion, when combined with a second portion of the complete redemption code, defining the complete redemption code that is sufficient for redemption at the POS terminal,
      determine the second portion based upon the first portion relative to the complete redemption code,
      manipulate the image of the paper coupon to generate a modified image sufficient for redemption by appending the second portion to the first portion so that the modified image is sufficient for redemption at the POS terminal, and
      store in said memory the modified image for subsequent retrieval by the mobile wireless communications device and redemption as a digital coupon at the POS terminal based upon the stored modified image being displayed on the mobile wireless communications device for redemption as the digital coupon.

7. The digital coupon conversion server of claim 6 wherein the paper coupon comprises a paper substrate with the coded indicia thereon.

8. The digital coupon conversion server of claim 6 wherein the coded indicia comprises an incomplete barcode.

9. The digital coupon conversion server of claim 6 wherein the coded indicia comprises an incomplete GS1 barcode.

10. The digital coupon conversion server of claim 6 wherein the modified image comprises a complete GS1 code.

11. A method of processing a paper coupon comprising coded indicia insufficient for redemption, the method comprising:
    using a digital coupon conversion server comprising a processor cooperating with a memory to
       receive an image of the paper coupon from a mobile wireless communications device configured to acquire the image of the paper coupon, the coded indicia defining a first portion of a complete redemption code, the first portion defining an incomplete redemption code that is insufficient for redemption at a point-of-sale (POS) terminal, and the first portion, when combined with a second portion of the complete redemption code, defining the complete redemption code that is sufficient for redemption at the POS terminal, determine the second portion based upon the first portion relative to the complete redemption code, manipulate the image of the coupon to generate a modified image sufficient for redemption by appending the second portion to the first portion so that the modified image is sufficient for redemption at the POS terminal, and store in the memory the modified image for subsequent retrieval by the mobile wireless communications device and redemption as a digital coupon at the POS terminal based upon the stored modified image being displayed on the mobile wireless communications device for redemption as the digital coupon.

12. The method of claim 11 wherein the paper coupon comprises a paper substrate with the coded indicia thereon.

13. The method of claim 11 wherein the coded indicia comprises an incomplete GS1 barcode.

14. The method of claim 11 wherein the modified image comprises a complete GS1 code.

15. A non-transitory computer readable medium for processing a paper coupon comprising coded indicia insufficient for redemption, the non-transitory computer readable medium comprising computer executable instructions that when executed by a processor coupled to a memory cause the processor to perform operations comprising:

receiving an image of the paper coupon from a mobile wireless communications device configured to acquire the image of the paper coupon, the coded indicia defining a first portion of a complete redemption code, the first portion defining an incomplete redemption code that is insufficient for redemption at a point-of-sale (POS) terminal, and the first portion, when combined with a second portion of the complete redemption code, defining the complete redemption code that is sufficient for redemption at the POS terminal;

determining the second portion based upon the first portion relative to the complete redemption code, manipulating the image of the paper coupon to generate a modified image sufficient for redemption by appending the second portion to the first portion so that the modified image is sufficient for redemption at the POS terminal; and storing in the memory the modified image for subsequent retrieval by the mobile wireless communications device and redemption as a digital coupon at the POS terminal based upon the stored modified image being displayed on the mobile wireless communications device for redemption as the digital coupon.

16. The non-transitory computer readable medium of claim 15 wherein the paper coupon comprises a substrate with the coded indicia thereon.

17. The non-transitory computer readable medium of claim 15 wherein the coded indicia comprises an incomplete GS1 barcode.

18. The non-transitory computer readable medium of claim 15 wherein the modified image comprises a complete GS1 code.

* * * * *